United States Patent [19]
Kidd et al.

[11] 3,881,817
[45] May 6, 1975

[54] OPTICAL ALIGNMENT SYSTEM FOR AN ORIGINAL DOCUMENT

[75] Inventors: Wayne L. Kidd, Fairport; Theodore W. Thomas, Henrietta, both of N.Y.

[73] Assignee: Xerox Corporation, Stamford, Conn.

[22] Filed: Jan. 23, 1974

[21] Appl. No.: 435,789

[52] U.S. Cl. ..................... 355/12; 355/43; 355/60; 355/75
[51] Int. Cl. .......................................... G03b 27/62
[58] Field of Search ............. 355/77, 59, 60, 75, 43, 355/12

[56] References Cited
UNITED STATES PATENTS

| | | | |
|---|---|---|---|
| 2,428,627 | 10/1947 | Kalman | 355/59 X |
| 3,036,495 | 5/1962 | Kuster | 355/60 |
| 3,254,559 | 6/1966 | Swiggett et al. | 355/77 |
| 3,740,131 | 6/1973 | Hirose | 355/75 |
| 3,741,644 | 6/1973 | Matsumoto et al. | 355/59 X |

*Primary Examiner*—Richard A. Wintercorn
*Attorney, Agent, or Firm*—H. Fleischer; C. A. Green; J. J. Ralabate

[57] ABSTRACT

An optical system in which a grid light image is projected onto a support having an original document mounted thereon. The original document is aligned on the support relative to the projected grid light image. After the original document is aligned, the grid light image is de-energized and a light image of the original document is then formed.

12 Claims, 4 Drawing Figures

OPTICAL ALIGNMENT SYSTEM FOR AN ORIGINAL DOCUMENT

BACKGROUND OF THE INVENTION

This invention relates generally to an electrophotographic printing machine, and more particularly concerns an optical system providing registration for an original document being reproduced in the printing machine.

In the art of electrophotographic printing, as originally disclosed in U.S. Pat. No. 2,297,691 issued to Carlson in 1942, a photoconductive surface is uniformly charged and exposed to a light image of the original document. Exposure of the photoconductive surface creates an electrostatic latent image corresponding to the original document. Toner particles are then electrostatically attracted to the latent image to render it viewable. Subsequently, the toner powder image is transferred to a sheet of support material and permanently affixed thereto producing a copy of the original document.

Since the time of Carlson, electrophotographic printing has further progressed to include color capabilities. The process of color electrophotographic printing is substantially similar to black and white electrophotographic printing. However, rather than forming a total light image of the original document, the light image is filtered to produce a single color light image which is a partial light image of the original document. The foregoing single color light image exposes the charged photoconductive surface to create a single color electrostatic latent image. This single color electrostatic latent image is developed with toner particles of a color complementary to the single color light image. The single color toner powder image is then transferred from the electrostatic latent image to a sheet of support material. The foregoing process is repeated a plurality of cycles with differently colored light images and complementarily colored toner particles. These single color toner powder images are transferred to the sheet of support material in superimposed registration with one another forming a multi-layered powder image thereon. The multi-layered powder image is permanently affixed to the sheet of support material forming a color copy thereon.

Hereinbefore, mechanical means have been employed to register the original document with respect to the photoconductive surface. For example, registration marks or tabs disposed on the support member holding the original document are frequently employed to locate the original document relative to the photoconductive surface. However, with the advent of multicolor electrophotographic printing, it has been found to be desirable to delete or insert additional portions to the original document. Moreover, it is highly desirable to have a work surface which is illuminated to enable the machine operator to fabricate color original documents for reproduction in the color electrophotographic printing machine. Furthermore, in view of the fact that the color printing machine utilizes a multi-pass process, it may be desirable to employ separation masters as the original documents for reproduction. When separation masters are employed, each master must be registered relative to the previous master within a prescribed tolerance. Thus, successive originals must be repositioned on the support member within close tolerances. The foregoing techniques do not rely on corner registration. Finally, it may be advantageous to be able to mask portions of the original document. Masks may be created on an illuminated member having a grid thereon. The masks and original document are positioned relative to one another on the grid of the support. This prevents the reproduction of selected portions of the original document, or enables the insertion of additional material therein.

Accordingly, it is a primary object of the present invention to improve the optical system employed in an electrophotographic printing machine.

SUMMARY OF THE INVENTION

Briefly stated and in accordance with the present invention, there is provided an optical system arranged to create a light image of an aligned original document.

This is achieved, in the present instance, by a support member arranged to hold the original document thereon. Means are provided for projecting a grid light image onto the support member. This enables the original document to be aligned on the support member relative to the grid light image projected thereon. Thereafter, upon de-energizing the grid light image projecting means, light image creating means form a light image of the aligned original document.

BRIEF DESCRIPTION OF THE DRAWINGS

Other objects and advantages of the present invention will become apparent upon reading the following detailed description and upon reference to the drawings, in which.

While the present invention will be described in connection with the preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF INVENTION

Figure 1:
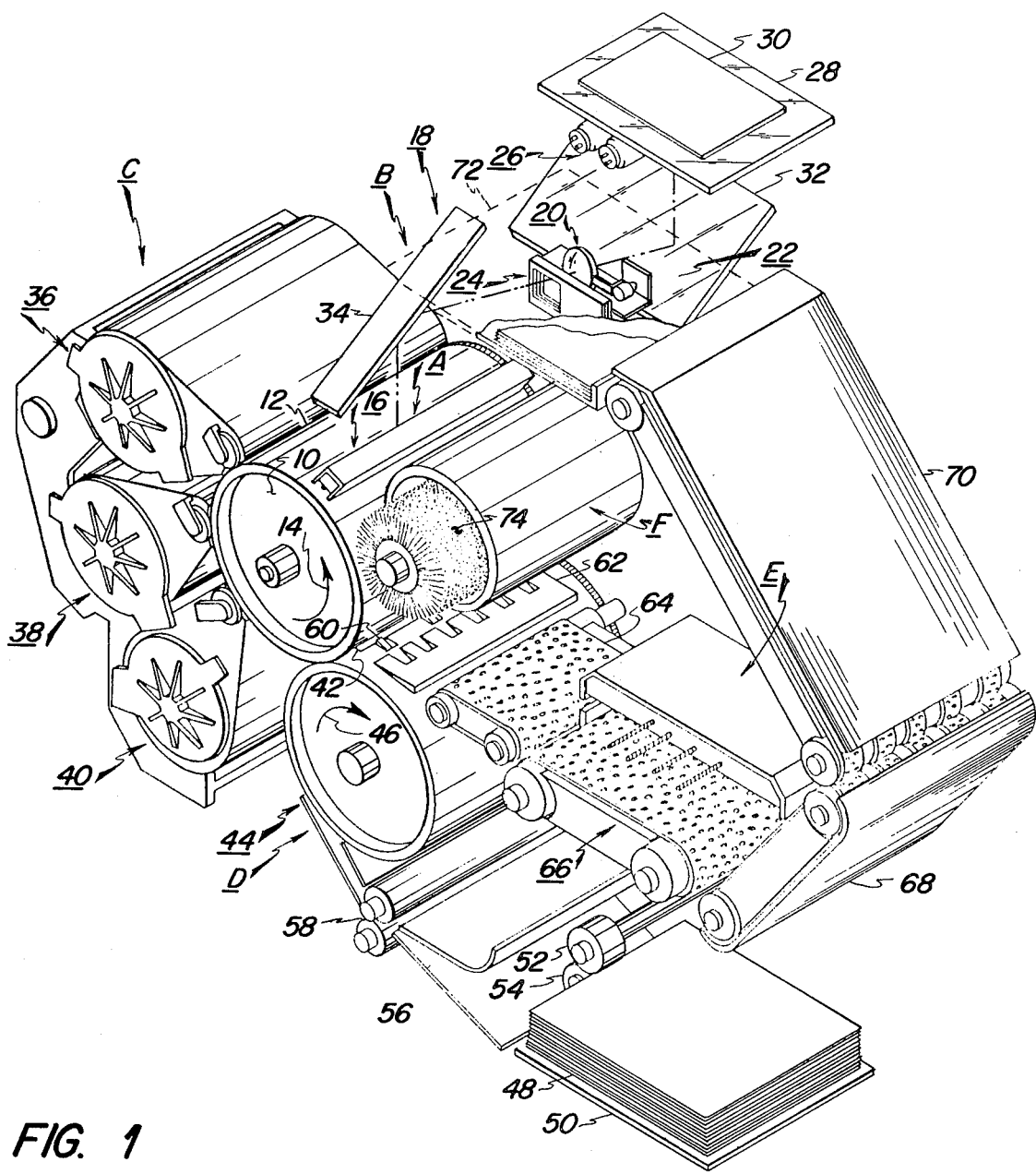
FIG. 1 is a schematic perspective view of a color electrophotographic printing machine incorporating the features of the present invention therein.

With continued reference to the drawings, FIG. 1 schematically illustrates a color electrophotographic printing machine employing the features of the present invention therein. In the drawings, like reference numerals have been used throughout to designate like elements. The various components of the color electrophotographic printing machine are depicted schematically in FIG. 1. As shown therein, color copies are created from a colored original document located in the FIG. 1 printing machine. Although the optical system of the present invention is particularly well adapted for use in a color electrophotographic printing machine, it will become evident from the following description that it is equally well suited for use in a wide variety of printing machines and is not necessarily limited to the particular embodiment shown herein.

In FIG. 1, the printing machine is shown as having a drum 10 with a photoconductive surface 12 secured to and entrained about the circumferential surface thereof. Drum 10 is mounted rotatably within the machine (not shown). A series of processing stations are disposed such that as drum 10 rotates in the direction of arrow 14, photoconductive surface 12 passes sequentially therethrough. Drum 10 is driven at a predetermined speed relative to the other machine operating mechanisms by a drive motor (not shown). A suitable photoconductive material is disclosed in U.S. Pat. No. 3,655,377 issued to Sechak in 1972. A timing disc is mounted in the region of one end of drum 10 and rotates in conjunction therewith. The timing disc is adapted to trigger the logic circuitry of the printing machine to coordinate the various machine operations producing the proper sequence of events at the respective processing stations.

First, drum 10 advances photoconductive surface 12 to charging station A. At charging station A, a corona generating device, indicated generally at 16, extends in a generally longitudinal direction transversely across photoconductive surface 12. In this manner, corona generating device 16 charges photoconductive surface 12 to a relatively high substantially uniform potential. One type of suitable corona generating device is of the type described in U.S. Pat. No. 2,778,946 issued to Mayo in 1957.

Drum 10, thereafter, is rotated to exposure station B. Exposure station B includes thereat the optical system of the present invention, generally designated by the reference numeral 18. Optical system 18 includes a moving lens system, generally designated by the reference numeral 20, a grid projection system, generally designated by the reference numeral 22, a color filter mechanism, shown generally at 24, and a light source designated by the reference numeral 26. A support member, indicated generally by the reference numeral 28, holds original document 30 thereon. Support member 28, preferably, includes a substantially rectangular transparent member, made of glass, which is secured by suitable means to the frame of the electrophotographic printing machine shown in FIG. 1. The transparent member or platen rests upon resilient means or a soft edge gasket which is attached to a horizontally dependent flange of the rigid machine frame. A cover plate, affixed to the machine frame is placed thereover and provided with an opening therein to expose the top surface of the platen. The foregoing is described in greater detail in co-pending U.S. application Ser. No. 340,156 filed Mar. 12, 1973, the disclosure of which is hereby incorporated into the present application. Light source 26 is positioned beneath transparent platen 28 to illuminate original document 30. Light source 26, lens 20, filter 24, and grid projection system 22 move in a timed relation with drum 10 to scan successive incremental areas of original document 26 disposed upon platen 28. Mirror 32 reflects the light rays transmitted from original document 26 through lens 20. After passing through lens 20, the light rays are transmitted through filter 24, i.e. a selected color separation filter is inserted into the path of the light rays. Thereafter, the light rays are reflected from a second mirror 34 onto photoconductive surface 12 of drum 10 to selectively dissipate the charge thereon in the irradiated areas recording a single color electrostatic latent image thereon. As heretofore indicated, the appropriate color filter operates on the light rays passing through lens 20 to record an electrostatic latent image on photoconductive surface 12 corresponding to a preselected spectal region of the electromagnetic wave spectrum, hereinafter referred to as a single color electrostatic latent image. Optical system 18, and in particular, grid projection system 22, will be described hereinafter in greater detail with reference to FIGS. 2 through 4, inclusive.

Continuing now with the printing process, after exposure, drum 10 rotates the single color electrostatic latent image recorded on photoconductive surface 12 development station C. Development station C includes thereat three individual developer units, generally indicated by the reference numerals 36, 38 and 40, repectively. Preferably, the developer units are all of a type generally referred to as magnetic brush developer units. A typical magnetic brush developer unit employs a magnetizable developer mix having carrier granules and toner particles. The developer mix is continually brought through a directional flux field to form a brush thereof. Each developer unit includes a developer roll electrically biased to the appropriate potential such that toner particles are attracted from the carrier granules to the areas of photoconductive surface 12 having a greater charge thereon, i.e. the single color electrostatic latent image. The single color electrostatic image recorded on photoconductive surface 12 is developed by bringing the brush of developer mix into contact therewith. Each of the respective developer units contain discretely colored toner particles corresponding to the complement of the spectral region of the wave length of light transmitted through filter 24. For example, a green filtered electrostatic latent image is rendered visible by depositing green absorbing magenta toner particles thereon. Similarly, blue and red latent images are developed with yellow and cyan toner particles, respectively.

Drum 10 is next rotated to transfer station D where the toner powder image adhering electrostatically to photoconductive surface 12 is transferred to a sheet of support material 42. Support material 42 may be plain paper, or a sheet of transparent, thermoplastic material. A transfer roll, shown generally at 44, rotates support material 42 in the direction of arrow 46. Transfer roll 44 is electrically biased to a potential of sufficient magnitude and polarity to electrostatically attract toner particles from photoconductive surface 12 to support material 42. U.S. Pat. No. 3,612,677, issued to Langdon et al. in 1972, discloses a suitable electrically biased transfer roll. Transfer roll 44 is arranged to rotate in synchronism with drum 10, i.e. transfer roll 44 and drum 10 rotate at substantially the same angular velocity and have substantially the same outer diameter. Support material 42 is secured to transfer roll 44 and moves therewith in a recirculating path so that successive toner powder images may be transferred from photoconductive surface 12 to support material 42 in superimposed registration with one another. Hence, a multi-layered toner powder image is formed on support material 42.

Referring once again to FIG. 1, the sheet feeding path for advancing support material 42 to transfer roll 44 will be briefly described. A stack 48 of support material 44 is supported on tray 50. Feed roll 52, operatively associated with retard roll 54, separates and advances the uppermost sheet from stack 48. The advancing sheet moves into chute 56 and is directed into the nip of register rolls 58. Next, gripper fingers 60, mounted on transfer roll 44, releasably secure thereto support material 42 for movement therewith in a recirculating path. After substantially all of the discretely colored toner powder images have been transferred to support material 42, gripper fingers 60 space support material 42 from transfer roll 44. This enables stripper bar 62 to be interposed between support material 42 and transfer roll 44 separating support material 42 therefrom. After support material 42 is stripped from transfer roll 44, it is moved on endless conveyor belt 64 to fixing station E.

At fixing station E, a suitable fuser, indicated generally at 66, heats the multi-layered powder image to affix it to support material 42. A typical fuser is described in U.S. Pat. No. 3,498,592 issued to Moser in 1970. After the multi-layered, toner powder image is fixed to support material 42, endless belt conveyors 68 and 70 advance support material 42 to catch tray 72. Catch tray 72 is arranged to enable the machine operator to readily remove the final color copy from the printing machine.

Invariable, some residual toner particles remain on photoconductive surface 12 after the transfer of the toner powder image therefrom to support material 42. These residual toner particles may be removed from photoconductive surface 12 by passing it through cleaning station F. At cleaning station F, the residual toner particles are brought under the influence of a cleaning corona generating device (not shown) adapted to neutralize the electrostatic charge remaining thereon and on photoconductive surface 12. The neutralized toner particles are then removed from photoconductive surface 12 by rotatably mounted brush 74 in contact therewith. A suitable brush cleaning device is described in U.S. Pat. No. 3,590,412 issued to Gerbasi in 1971.

Figure 2:
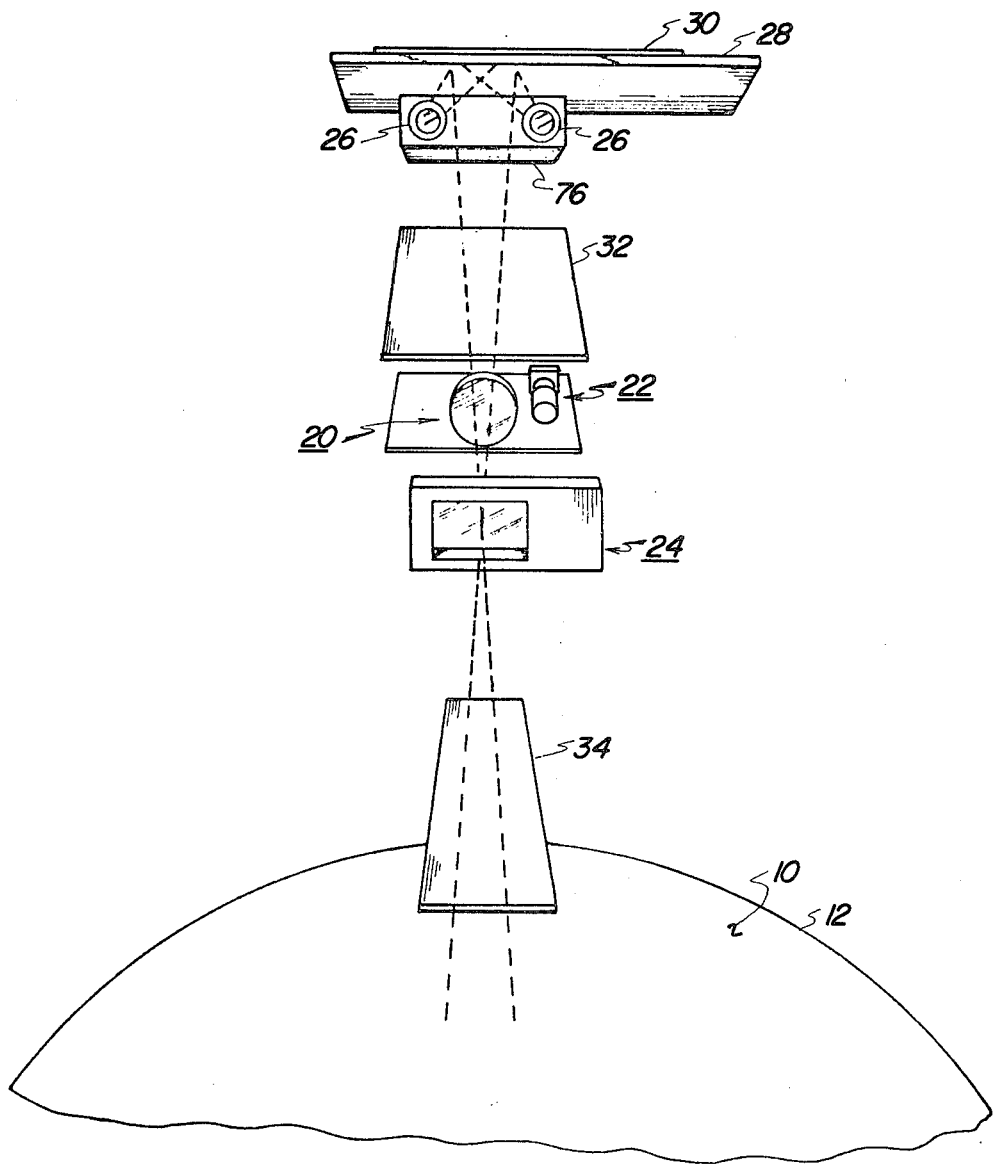
FIG. 2 is a schematic illustration of the FIG. 1 printing machine optical system.

Referring now to FIG. 2, there is shown lamp carriage 76 supporting a light source or pair of scan lamps 26 thereon. Lamp carriage 76 is arranged to traverse platen 28 illuminating incremental widths of original document 30 disposed thereon. A cable pulley system from the motor (not shown) driving drum 10 drives lamp carriage 76. As scan lamp 26 traverses platen 28, another cable pulley system acts to also move lens 20. Lens 20 moves at a correlated speed with light source 26 on suitable rollers surrounding a shaft (not shown). Filter mechanism 24 is mounted by a suitable bracket on lens 20 and moves therewith. Thus, lens 20, filter 24 and scan lamp 26 scan original document 30 to create a single color flowing light image thereof. Upon reaching the end of the scan path of platen 28, lens 20, scan lamp 26 and filter 24 are spring biased to return to their original position to initiate the start of the next cycle. It should be evident that the movement of lens 20, filter 24 and scan lamp 26 are correlated with the speed of rotation of drum 10 for exposure of photoconductive surface 12. For further details regarding the drive system of this optical system, reference is made to U.S. Pat. No. 3,062,109 issued to Mayo, et al, in 1962.

Preferably, lens 20 is a six element split dagor lens having front and back compound lens components with a centrally located diaphram therebetween. This lens forms a high quality image with a field angle of 31° and a speed of F 4.5 at 1:1 magnification. In addition, the lens is designed to minimize the effect of secondary color at the image plane. The front lens component has three lens elements including, in the following order; a first lens element of positive power, a second lens element of negative power cemented to the first lens element, and a third lens element of positive power disposed between the second lens element and diaphram. The back lens component also has three similar lens elements positioned so that lens 20 is symmetrical. In a specific embodiment of the lens, the first lens element in the front component is a double convex lens, the second lens element a double concave lens, and the third lens element a convex-concave lens element. For greater details regarding lens 20, reference is made to U.S. Pat. No. 3,592,531 issued to McCrobie in 1971.

Turning once again to FIG. 2, filter 24 comrises a housing which is mounted on lens 20 by a suitable bracket and moves with lens 20 during scanning as a single unit. The housing of filter 24 includes a window which is positioned relative to lens 20 to allow the light rays reflected from mirror 32 to pass therethrough. The bottom and top walls of the housing member include a plurality of tracks which extend the entire width thereof. Each track is adapted to carry a filter in a manner to allow movement thereof from an inoperative position to an operative position interposed in the window of the housing to allow light rays to pass therethrough. The individual filters are made of any suitable filter material, such as a coated glass. Three filters are utilized in the electrophotographic printing machine of FIG. 1. The filters are biased into the operative position, in the window of the housing member, by individual extension springs. When inoperative, the filters are locked into position out of line with the housing window by means of a stop pin which extends in an upwardly direction through the opening in the bottom of the housing member into the respective track of each filter. The solenoid arm, in association with the stop pin, retains the filters in the inoperative position. A selected filter is inserted into the optical path of the housing window by the activation of the appropriate solenoid. By activating this solenoid, the respective stop pin is moved downwardly from the track of the appropriate filter, thereby allowing the spring cooperating with the filter in that track to pull the filter into the housing window. When a filter is activated into an operative position in the housing window, the filter will remain there throughout the entire scanning of the original document. The foregoing filter system is described in greater detail in U.S. Pat. No. 3,775,006 issued to Hartman et al. on Nov. 27, 1973, the disclosure of which is hereby incorporated into the present application. Preferably, filter mechanism 24 includes three filters, a blue filter, a red filter and a green filter. Each of the filters is associated with its respective toner particles, i.e. the complement of the color thereof to produce a subtractive system. As heretofore indicated, a green filtered light image is developed with magenta toner particles, a blue filtered light image is developed with yellow toner particles, and a red filtered light image is developed with cyan toner particles.

With continued reference to FIG. 1, each scan lamp 26 includes three phosphors having a color balance such that the blue/green ratio is preferably about 0.3 and the red/green ratio is preferably about 0.53. The spectral energy distribution of the red output is about 44 microwatts/centimeter$^2$, the green output about 82 microwatts/centimeter$^2$, and the blue output about 25 microwatts/centimeter$^2$. The exterior circumferential surface of each scan lamp 26 is opaque with a clear region extending over about a 45° arc thereon. The clear region extends substantially along the entire length of each of the tubularly configured scan lamps 26. As hereinbefore indicated, scan lamps 26 are tri-phosphor lamps having peak energy outputs in the region of the blue, green and red wave length. The corresponding filters are arranged to permit a light image having a specified bandwidth to pass therethrough. Hence, a blue filter only permits the light image in the blue region to be transmitted therethrough, a red filter only the light image in the red region and a green filter only a light image in the green region. In summary, scan lamps 26 project light rays through transparent support member 28 onto original document 30. The light rays are reflected from original document 30 onto mirror 32. Mirror 32 reflects the light rays through lens 20 and the light rays passing through lens 20 are transmitted through filter mechanism 24. The filtered single color light image is then reflected from mirror 34 onto charge photoconductive surface 12 of drum 10.

Figure 3:
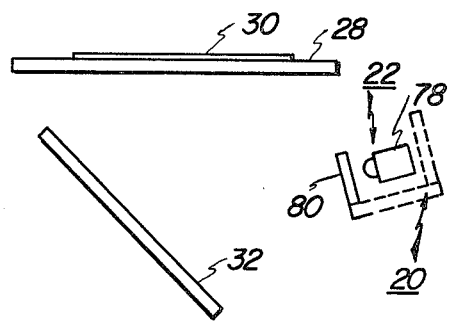
FIG. 3 is a fragmentary elevational view depicting a portion of the FIG. 2 optical system.

Referring now to FIG. 3, there is shown a portion of optical system 18. As depicted therein, a grid light image is projected onto platen 28 to allow for the alignment of original document 30 thereon or for selected portions thereof to be masked. The apparatus associated with the projection of the grid is disclosed hereinafter. Grid projection system 22 includes a grid projecting lamp 78 having a transparent member 80 disposed in the focal plane thereof. Transparent member 80 may be a glass having an etched grid thereon. Thus, the light image having the grid thereon is projected onto mirror 32 which reflects the grid light image onto platen 28. After the original document 30 is aligned on platen 28 relative to the grid light image, or portions thereof are masked, the print button is depressed. This button de-energizes lamp 78 and energizes scan lamp 26 to initiate the start of the printing cycle hereinbefore described. The circuitry employed for automatically energizing the printing cycle and scan lamp 26 when lamp 78 is de-energized will be described hereinafter with reference to FIG. 4.

In order to mask original document 30, original document 30 is positioned on support member 28 with respect to a specific grid portion thereon. Thereafter, the operator positions non-light absorbing opaque strips on those portions of the grid wherein the original is desired to be masked. Moreover, if the non-light absorbing opaque strip has indicia thereon, information may be added to the original document. Alternatively, a small original document may be disposed on one portion of the grid light image and the non-light absorbing strip having indicia thereon positioned on another portion of the grid. In this way, the resultant copy will contain information from the original document and the opaque strip. Thus, not only may portions of the original document be masked, but new matter may be relatively easily inserted into the copy of the original document. Moreover, separation masters may be employed to form a composite copy therefrom. For example, initially a first separation may be placed on the grid projected onto support member 28. Thereafter, successive masters are placed on support member 28 in substantially the same location as the first original document. The registration of successive separation masters is made relatively simple by the plurality of grid lines being projected thereon. Thus, the grid light image enables successive separation masters to be aligned in registration with one another on the support sheet resulting in the successive images also being in registration with one another on the copy sheet. Each separation master is reproduced in one color on the copy forming a multi-color copy.

Figure 4:
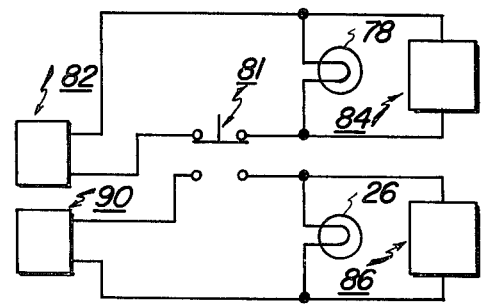
FIG. 4 is a schematic electrical circuit diagram arranged to be employed in conjunction with the FIG. 2 optical system.

Referring now to FIG. 4, there is shown the detailed circuit arrangement adapted to de-energize grid projection lamps 78 when scan lamp 26 is energized. As shown therein, switch 81 is initially positioned to connect voltage source or power supply 82 with grid projection lamps 78. Preferably, power supply 82 is about 115 volts AC. A blower 84 is positioned so as to also be energized when switch 81 is in the position indicated by FIG. 4. Blower 84 cools grid projection lamp 78. Hence, when switch 81 is connecting grid projection lamp 78 with power supply 82, grid projection lamp 78 is energized. This grid light image is projected onto support member 28. After the original document has been aligned thereon or masked, switch 81 is depressed to connect scan lamp power supply 90 with scan lamp 26. Power supply 90 is also preferably a N5 volt AC supply. Simultaneously, with the energization of scan lamp 26, grid projection lamp 78 is de-energized as it is no longer connected with the power supply 82. When power supply 90 is connected with scan lamp 26, scan lamp 26 is energized. In addition, connecting scan lamp 26 with power supply 90 also electrically connects blower 86 thereto. Blower 86 is adapted to cool scan lamp 26. Hence, when the grid light image is automatically de-energized, the light image of the original document is automatically formed and projected onto the charged photoconductive surface to form an electrostatic latent image thereon. This initiates the reproducing process.

While the invention has been described in connection with a pair of blowers and a pair of power supplies, one skilled in the art will appreciate that the invention is not necessarily so limited and that a single blower and power supply may be employed for both the scan lamp and grid projection lamp.

In operation, original document 30 is disposed on platen 28. Thereafter, the operator depresses button or switch 81 to activate grid projection lamp 78. The grid light image is projected onto support member 28. The operator then aligns original document 30 on support member 28 relative to the grid light image being projected thereon. Then, the operator once again presses switch 81 to de-energize grid projection lamp 78 and to automatically energize scan lamp 26. The energization of scan lamp 26 initiates the reproduction process whereby a copy of the original document is produced. As hereinbefore indicated, the reproduction process comprises charging the photoconductive member to a substantially uniform level, projecting a light image of the original document thereon to dissipate the charge in selected areas, developing the electrostatic latent image with toner particles, transferring the toner powder image to a sheet of support material repeating the foregoing a plurality of cycles, and permanently affixing the multi-layered toner powder image to the sheet of support material. This process creates a color copy of the original document. In addition, when the original document is placed on the support material with the grid light image projected thereon, strips of non-light absorbing material may be interposed between the original document and the support member to mask selected portions thereof. Moreover, the nonlight absorbing material may contain indicia thereon adapted to be inserted into the copy of the original document.

It therefore appears that there has been provided an apparatus and method of use for aligning and masking selected portions of original documents employed in the multi-color electrophotographic process. The foregoing technique requires the projection of a grid light image onto a substantially transparent support member holding the original document thereon. This approach is relatively simple to implement and merely requires the inclusion of a projection lamp and etched transparent member in the focal plane thereof to create the grid light image which is projected onto the transparent platen through the mirrors employed in the optical system of the electrophotographic printing machine.

Thus, it is apparent that there has been provided, in accordance with the present invention, an apparatus and method associated therewith for aligning, registering and masking original documents employed in an electrophotographic printing machine that fully satisfies the objects, aims and advantages set forth above. While the present invention has been described in conjunction with a specific embodiment and method of use thereof, it is evident that many alternatives, modifications and variations will be apparent to those skilled in the art in light of the foregoing description. Accordingly, it is intended to embrace all such alternatives, modifications and variations that fall within the broad scope of the appended claims.

What is claimed is:

1. An optical system, including:
   a support member arranged to hold an original document;
   means for projecting a grid light image onto said support member so that the original document may be aligned on said support member relative to the grid light image projected thereon;
   means for creating a light image from the aligned original document disposed on said support member after deenergizing said grid light image projecting means; and
   at least one substantially non-light absorbing strip adapted to be positioned on said support member in a selected region of the grid projected thereon to mask a predetermined portion of the original document, said opaque strip having additional indicia thereon adapted to be inserted into the original document.

2. A system as recited in claim 1, wherein said support member incudes:
   a substantially rigid frame member having an aperture therein;
   resilient means secured to said frame member on the periphery of the aperture therein; and
   a transparent member having a generally planar surface, said transparent member being mounted on said resilient means in the aperture of said frame member permitting light rays to be transmitted therethrough.

3. A system as recited in claim 1, wherein said light image creating means includes:
   a light source arranged to illuminate the original document; and
   lens means for receiving the light rays from the original document to form a light image thereof.

4. A system as recited in claim 3, wherein said grid projecting means includes:
   a grid projection lamp; and
   a transparent member having a grid thereon, said transparent member being interposed between said support member and said grid projecting lamp in the focal plane thereof.

5. A system as recited in claim 4, further including circuit means arranged to automatically de-energize said grid projection lamp when energizing said light source.

6. A system as recited in claim 1, further including means, disposed in the path of the light image, for filtering the light image to produce a single color light image from a colored original document.

7. An electrophotographic printing machine of the type having a charged photoconductive surface, including:
   a support member arranged to hold an original document;
   means for projecting a grid light image onto said support member so that the original document may be aligned on said support member relative to the grid light image projected thereon;
   means for creating a light image from the aligned original document disposed on said support member after deenergizing said grid light image projecting means, whereby the light image irradiates the charged photoconductive surface to selectively dissipate the charge thereon in accordance with the intensity of the light image transmitted thereto; and
   at least one substantially non-light absorbing strip adapted to be positioned on said support member in a selected region of the grid projected thereon to mask a pre-determined portion of the original document, said opaque strip contains additional indicia thereon adapted to be inserted into the original document.

8. A printing machine as recited in claim 7, wherein said support member includes:
   a substantially rigid frame member having an aperture therein;
   resilient means secured to said frame member on the periphery of the aperture therein; and
   a transparent member having a generally planar surface, said transparent member being mounted on said resilient means in the aperture of said frame member permitting light rays to be transmitted therethrough.

9. A printing machine as recited in claim 7, wherein said light image creating means includes:
   a light source arranged to illuminate the original document; and
   lens means for receiving the light rays from the original document to form a light image thereof.

10. A printing machine as recited in claim 9, wherein said grid projecting means includes:
    a grid projection lamp; and
    a transparent member having a grid thereon, said transparent member being interposed between said support member and said grid projecting lamp in the focal plane thereof.

11. A printing machine as recited in claim 10, further including circuit means arranged to automatically de-energize said grid projection lamp when energizing said light source.

12. A printing machine as recited in claim 7, further including means, disposed in the path of the light image, for filtering the light image to produce a single color light image from a colored original document.

* * * * *